(12) United States Patent
Light-Holets et al.

(10) Patent No.: US 10,035,511 B2
(45) Date of Patent: Jul. 31, 2018

(54) METHOD AND SYSTEM FOR CONTROLLING OPERATION OF AN ENGINE POWERED DEVICE HAVING CYCLICAL DUTY CYCLES

(71) Applicant: CUMMINS INC., Columbus, IN (US)

(72) Inventors: Jennifer K. Light-Holets, Greenwood, IN (US); Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 37 days.

(21) Appl. No.: 15/220,009

(22) Filed: Jul. 26, 2016

(65) Prior Publication Data

US 2017/0028988 A1   Feb. 2, 2017

Related U.S. Application Data

(60) Provisional application No. 62/197,503, filed on Jul. 27, 2015.

(51) Int. Cl.
| | |
|---|---|
| *B60W 30/00* | (2006.01) |
| *B60W 30/188* | (2012.01) |
| *B60W 10/06* | (2006.01) |
| *B60W 10/08* | (2006.01) |
| *A01B 67/00* | (2006.01) |
| *A01F 15/08* | (2006.01) |

(52) U.S. Cl.
CPC .......... *B60W 30/188* (2013.01); *A01B 67/00* (2013.01); *B60W 10/06* (2013.01); *B60W 10/08* (2013.01); *A01F 15/0841* (2013.01); *B60W 2400/00* (2013.01); *B60W 2510/244* (2013.01); *B60W 2710/06* (2013.01); *B60W 2710/244* (2013.01)

(58) Field of Classification Search
USPC ......................................... 701/22
See application file for complete search history.

(56) References Cited

U.S. PATENT DOCUMENTS

| | | | | |
|---|---|---|---|---|
| 1,380,006 | A * | 5/1921 | Nielsen ................. | F16H 15/503 475/189 |
| 4,142,587 | A * | 3/1979 | Woodward ........... | A01B 61/025 172/123 |
| 5,006,093 | A * | 4/1991 | Itoh .................... | F16H 61/66259 474/28 |
| 5,355,749 | A * | 10/1994 | Obara .................... | B60K 6/543 477/15 |
| 5,722,502 | A * | 3/1998 | Kubo .................... | B60K 6/442 180/65.23 |

(Continued)

FOREIGN PATENT DOCUMENTS

WO   WO2012012655   1/2012

*Primary Examiner* — Jonathan L Sample
(74) *Attorney, Agent, or Firm* — Faegre Baker Daniels LLP

(57) ABSTRACT

A method of controlling operation of a powered device is provided, comprising determining whether the device is experiencing a cyclical load profile including high load conditions and low load conditions, applying a first power component to the device using an engine, the first power component corresponding to an average power required by the cyclical load profile, and applying a second power component to the device using a motor/generator, a sum of the first power component and the second power component corresponding to a power required by the powered device during the high load conditions.

20 Claims, 3 Drawing Sheets

(56) References Cited

U.S. PATENT DOCUMENTS

| | | | | |
|---|---|---|---|---|
| 5,898,282 A * | 4/1999 | Drozdz | B60L 11/123 | 180/65.235 |
| 6,053,833 A * | 4/2000 | Masaki | B60K 6/365 | 475/2 |
| 6,075,331 A * | 6/2000 | Ando | H02J 7/345 | 307/48 |
| 6,119,800 A * | 9/2000 | McComber | B60K 1/00 | 180/65.1 |
| 6,242,873 B1 * | 6/2001 | Drozdz | B60K 6/46 | 180/65.1 |
| 6,311,113 B1 * | 10/2001 | Danz | F16H 61/66259 | 474/28 |
| 6,514,175 B2 * | 2/2003 | Taniguchi | F16H 61/0021 | 477/138 |
| 6,615,118 B2 * | 9/2003 | Kumar | B60L 7/12 | 290/3 |
| 6,721,637 B2 * | 4/2004 | Abe | B60K 6/48 | 180/65.8 |
| 7,011,600 B2 * | 3/2006 | Miller | B62M 9/08 | 476/36 |
| 7,137,344 B2 * | 11/2006 | Kumar | B60K 6/46 | 105/35 |
| 7,234,873 B2 * | 6/2007 | Kato | F16C 13/006 | 384/463 |
| 7,512,477 B2 * | 3/2009 | Quigley | F02D 41/1406 | 701/103 |
| 7,574,935 B2 * | 8/2009 | Rohs | F16H 15/42 | 474/83 |
| 7,909,727 B2 * | 3/2011 | Smithson | F16H 15/28 | 476/36 |
| 7,976,426 B2 * | 7/2011 | Smithson | F16H 15/28 | 476/38 |
| 7,977,852 B2 * | 7/2011 | Ward | F03G 7/08 | 310/325 |
| 8,050,856 B2 * | 11/2011 | Duty | B60W 10/02 | 180/338 |
| 8,167,759 B2 * | 5/2012 | Pohl | F02B 67/04 | 180/53.8 |
| 8,171,636 B2 * | 5/2012 | Smithson | F16H 15/28 | 29/893 |
| 8,360,917 B2 * | 1/2013 | Nichols | B62M 11/16 | 475/189 |
| 8,374,781 B2 * | 2/2013 | Hartman | G01C 21/3484 | 701/123 |
| 8,401,733 B2 * | 3/2013 | Weslati | B60W 50/085 | 701/36 |
| 8,606,451 B2 * | 12/2013 | Abdel-Baqi | E02F 9/0808 | 701/22 |
| 8,682,550 B2 * | 3/2014 | Nelson | F16H 63/50 | 180/170 |
| 8,775,041 B2 * | 7/2014 | Kresse | F16H 61/0213 | 701/52 |
| 8,862,346 B2 * | 10/2014 | Saltsman | G01M 17/007 | 701/51 |
| 9,598,838 B2 * | 3/2017 | Kaneko | B60K 6/46 | |
| 2001/0008192 A1 * | 7/2001 | Morisawa | B60K 6/46 | 180/197 |
| 2001/0044361 A1 * | 11/2001 | Taniguchi | F16H 61/0021 | 477/111 |
| 2002/0169051 A1 * | 11/2002 | Oshidari | F16H 61/0025 | 476/10 |
| 2003/0015358 A1 * | 1/2003 | Abe | B60K 6/48 | 180/65.25 |
| 2003/0015874 A1 * | 1/2003 | Abe | B60K 6/48 | 290/40 C |
| 2003/0104899 A1 * | 6/2003 | Keller | B60K 6/24 | 477/2 |
| 2004/0193363 A1 * | 9/2004 | Schmidt | A01B 69/007 | 701/23 |
| 2005/0113202 A1 * | 5/2005 | Miller | B62D 5/0409 | 475/215 |
| 2006/0108956 A1 * | 5/2006 | Clark | B60L 3/108 | 318/139 |
| 2006/0180363 A1 * | 8/2006 | Uchisasai | B60K 6/48 | 180/65.275 |
| 2007/0004556 A1 * | 1/2007 | Rohs | F16H 15/42 | 477/130 |
| 2008/0033624 A1 * | 2/2008 | Gronau | B60K 31/04 | 701/93 |
| 2008/0081728 A1 * | 4/2008 | Faulring | F16H 15/40 | 476/40 |
| 2008/0109125 A1 * | 5/2008 | Hahn | B60K 6/48 | 701/22 |
| 2008/0201019 A1 * | 8/2008 | Kumar | B61L 3/006 | 700/286 |
| 2008/0208401 A1 * | 8/2008 | Kumar | B61L 3/006 | 701/19 |
| 2008/0281479 A1 * | 11/2008 | King | B60L 11/123 | 701/22 |
| 2009/0103341 A1 * | 4/2009 | Lee | B60W 10/26 | 363/124 |
| 2010/0056322 A1 * | 3/2010 | Thomassy | F16H 15/28 | 476/39 |
| 2010/0131164 A1 * | 5/2010 | Carter | B60L 11/1805 | 701/61 |
| 2011/0041723 A1 * | 2/2011 | Kumar | B60L 9/16 | 105/35 |
| 2011/0166732 A1 * | 7/2011 | Yu | B60W 10/26 | 701/22 |
| 2011/0251743 A1 * | 10/2011 | Hu | B60K 6/24 | 701/22 |
| 2012/0035015 A1 * | 2/2012 | Ogawa | F16H 3/12 | 475/186 |
| 2012/0085319 A1 * | 4/2012 | Cleeves | F02D 11/105 | 123/399 |
| 2012/0227389 A1 * | 9/2012 | Hinderks | F01B 1/10 | 60/317 |
| 2012/0238386 A1 * | 9/2012 | Pohl | F02B 67/04 | 475/115 |
| 2012/0258839 A1 * | 10/2012 | Smithson | B60H 1/3222 | 477/42 |
| 2012/0309579 A1 * | 12/2012 | Miller | B62M 9/08 | 475/189 |
| 2013/0091694 A1 * | 4/2013 | Hussain | B60W 20/00 | 29/593 |
| 2013/0096745 A1 * | 4/2013 | Hussain | B60W 20/00 | 701/22 |
| 2013/0096746 A1 * | 4/2013 | Hussain | B60W 10/02 | 701/22 |
| 2013/0096747 A1 * | 4/2013 | Hussain | B60W 10/06 | 701/22 |
| 2013/0096748 A1 * | 4/2013 | Hussain | B60W 10/06 | 701/22 |
| 2013/0096749 A1 * | 4/2013 | Hussain | B60K 6/46 | 701/22 |
| 2013/0096759 A1 * | 4/2013 | Breton | B60W 20/10 | 701/22 |
| 2013/0221761 A1 * | 8/2013 | DePaso | B65G 17/08 | 307/151 |
| 2013/0274982 A1 * | 10/2013 | Tagami | B60K 6/442 | 701/22 |
| 2013/0293007 A1 * | 11/2013 | Tagami | B60L 11/1816 | 307/10.1 |
| 2014/0094998 A1 * | 4/2014 | Cooper | B61L 3/006 | 701/2 |
| 2014/0300113 A1 * | 10/2014 | Bachmann | F03G 7/08 | 290/1 R |
| 2015/0037178 A1 * | 2/2015 | Wang | F02G 5/02 | 417/380 |
| 2015/0217757 A1 * | 8/2015 | Okamoto | B60W 10/06 | 701/22 |
| 2015/0307083 A1 * | 10/2015 | Hisano | B60W 50/085 | 701/22 |

(56) References Cited

U.S. PATENT DOCUMENTS

2016/0115878 A1\* 4/2016 VanDerWege ...... F02D 41/1466
123/333
2016/0244044 A1\* 8/2016 Miller ................... B60W 10/06

\* cited by examiner

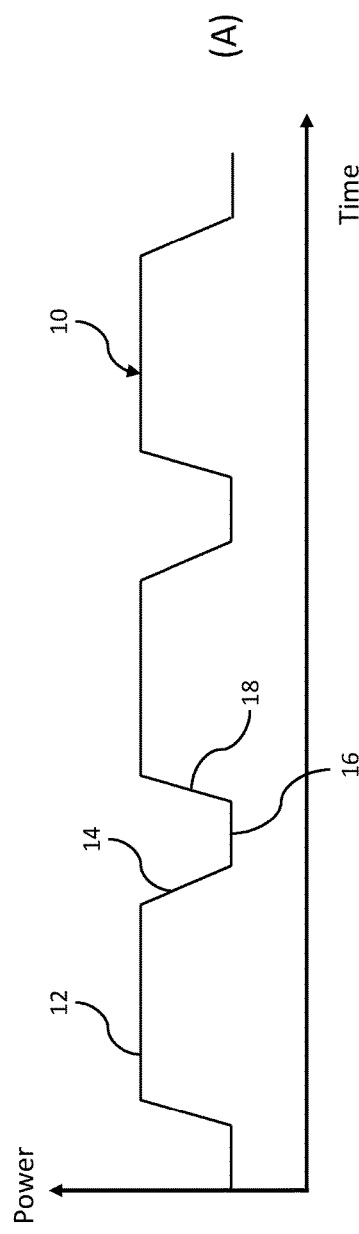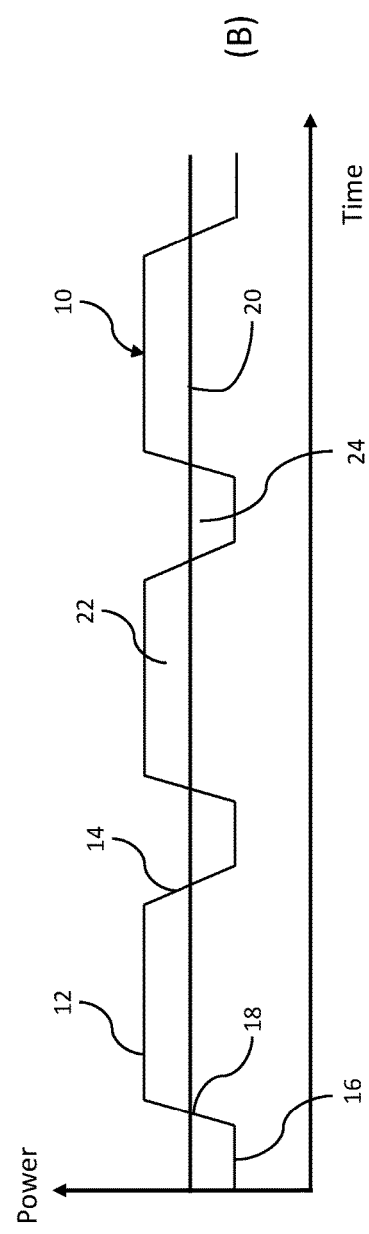

METHOD AND SYSTEM FOR CONTROLLING OPERATION OF AN ENGINE POWERED DEVICE HAVING CYCLICAL DUTY CYCLES

RELATED APPLICATIONS

This application claims priority to U.S. Provisional Patent Application Ser. No. 62/197,503, filed Jul. 27, 2015, the disclosure of which is expressly incorporated herein by reference in its entirety.

FIELD OF THE DISCLOSURE

The present disclosure generally relates to methods and systems for controlling operation of engine powered devices, and more particularly to controlling operation of engine powered devices that experience cyclical load conditions.

BACKGROUND OF THE DISCLOSURE

Some off-highway equipment applications have periods of operation that are cyclical. An example of this is a tractor being used to bale hay (i.e., a baler). The baler experiences high loads as hay is being baled, but experiences low loads when the end of a row is reached and the tractor is positioned to bale the next row. This cycle between high loads and low loads repeats as the tractor traverses the field. Other examples include certain concrete pump applications (high load while pumping, low load while attaching a new concrete supply), vacuum truck applications (high load while vacuuming, low load while moving to the next vacuuming site), and construction equipment applications. Hereinafter, the example of a tractor being used to bale hay will be described.

Such cyclical operation can cause driver discomfort as a result of sudden jerking motion in the driver's seat/cab when the equipment transitions between high load and low load operation. Additionally, such cyclical operation may cause mechanical stress in the equipment and undesirable transient response.

SUMMARY

The present disclosure proposes using a motor/generator ("MG") to provide a variable component of power required by the equipment and the engine to provide a relatively constant average power. This approach may integrate the capability to absorb excess energy when the hay baler is operating under low load conditions and to convert this energy to electrical energy for storage or immediate use. This would improve driver comfort, as he/she would not be subject to sudden jerking motion in the driver's seat/cab because the engine operates at a relatively constant power output. In one embodiment, the stored electrical energy is used to power the MG to provide the assist power during load pickup to again avoid sudden jerking motion.

By further integrating this feature with the tractor/ag implement controls, the system controlling the MG could receive information indicating that the baler operation is being initiated and/or in use. It could also receive information indicating when there is an operation error with the implement and use that in the control of the MG.

A field will typically produce several bales of hay. After the system according to the present disclosure recognizes that hay baling is in progress, the system can learn the dynamics of the particular field through the last few bales baled and use this information in controlling the electric MG to optimize driver comfort. Dynamics could include slope of terrain in the field, temperatures, type of grass, humidity, etc. In another embodiment, in addition to learning dynamics, the system could also utilize GPS information, information entered by the operator (acres to bale, type of baler—round/square, etc.), and/or information from intelligent transportations systems (e.g., eHorizon type systems) as inputs for controlling the electric MG.

According to one embodiment of the present disclosure, an apparatus for controlling a powered device is provided. The apparatus comprises: an engine; a motor/generator; an ECM operably coupled to the engine and the motor/generator and configured to: determine whether the powered device is experiencing a cyclical load profile including high load conditions and low load conditions; and respond to the powered device experiencing a cyclical load profile by applying a first power component to the powered device using the engine, the first power component corresponding to an average power required by the powered device during the cyclical load profile, and applying a second power component to the powered device using the motor/generator, a sum of the first power component and the second power component corresponding to a power required by the powered device during the high load conditions.

According to one embodiment of the present disclosure, a method of controlling operation of a powered device is provided. The method comprises: determining whether the powered device is experiencing a cyclical load profile including high load conditions and low load conditions; applying a first power component to the powered device using an engine, the first power component corresponding to an average power required by the powered device during the cyclical load profile; collecting power generated by the engine in excess of a power required by the powered device during the low load conditions; storing the collected power in an energy storage device; and applying a second power component to the powered device using a motor/generator, a sum of the first power component and the second power component corresponding to a power required by the powered device during the high load conditions; wherein applying the second power component by a motor/generator occurs in response to the power required by the powered device during the high load conditions exceeding the first power component.

According to another embodiment of the present disclosure, the method comprises: determining whether the powered device is experiencing a cyclical load profile including high load conditions and low load conditions; applying a first power component to the powered device using an engine, the first power component corresponding to an average power required by the powered device during the cyclical load profile; collecting power generated by the engine in excess of a power required by the low load conditions; storing the excess power in an energy storage device; applying a second power component to the powered device using a motor/generator in response to the first power component being less that a power required by the powered device during the high load conditions; and responding to a drift in a state-of-charge ("SOC") of the energy storage device by adjusting the first power component.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIGS. 1A and 1B are graphs of power profiles of equipment that experiences cyclical load conditions.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 2:
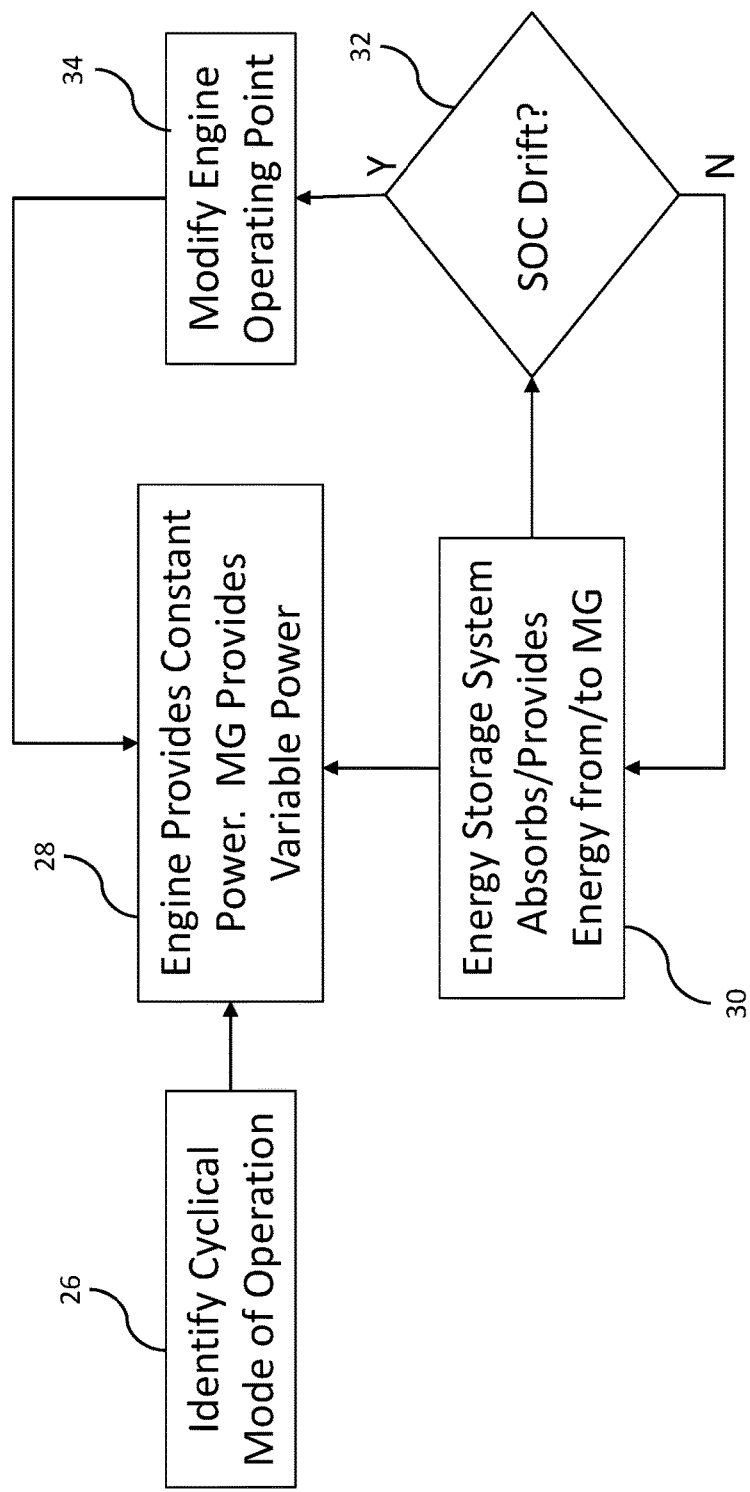
FIG. 2 is a block diagram of a control operation according to the principles of the present disclosure.

The embodiment disclosed below is not intended to be exhaustive or limit the disclosure to the precise form disclosed in the following detailed description. Rather, the embodiments are chosen and described so that others skilled in the art may utilize its teachings.

One of ordinary skill in the art will realize that the embodiments provided can be implemented in hardware, software, firmware, and/or a combination thereof. For example, the electronic control module ("ECM") disclosed herein may form a portion of a processing subsystem including one or more computing devices having memory, processing, and communication hardware. The ECM may be a single device or a distributed device, and the functions of the ECM may be performed by hardware and/or as computer instructions on a non-transient computer readable storage medium. For example, the computer instructions or programming code in the ECM may be implemented in any viable programming language such as C, C++, HTML, XTML, JAVA or any other viable high-level programming language, or a combination of a high-level programming language and a lower level programming language.

Referring initially to FIG. 1A, the cyclical power profile of an engine powered piece of equipment (in the case of this example, a tractor powered hay baler) is shown. Profile 10 includes high power portions 12, which correspond to periods of operation when the equipment experiences high load conditions such as while baling hay, trailing edge portions 14, which correspond to the equipment transitioning from a high load condition to a low load condition, low power portions 16, which correspond to periods of operation when the equipment experiences low load conditions such as while moving from one row to another row and not baling hay, and leading edge portions 18, which correspond to the equipment transitioning from a low load condition to a high load condition. As depicted, as the equipment bales hay across an entire field, moving row by row through the field, the equipment experiences cyclical load conditions corresponding to the cyclical power profile depicted in FIG. 1A. It is during the trailing edges 14 and the leading edges 18 (i.e., transitions between high and low load conditions) that the equipment and the equipment operator in this example will experience sudden jerking as the engine adjusts to the new load conditions by transitioning between high and low power delivery.

Figure 3:
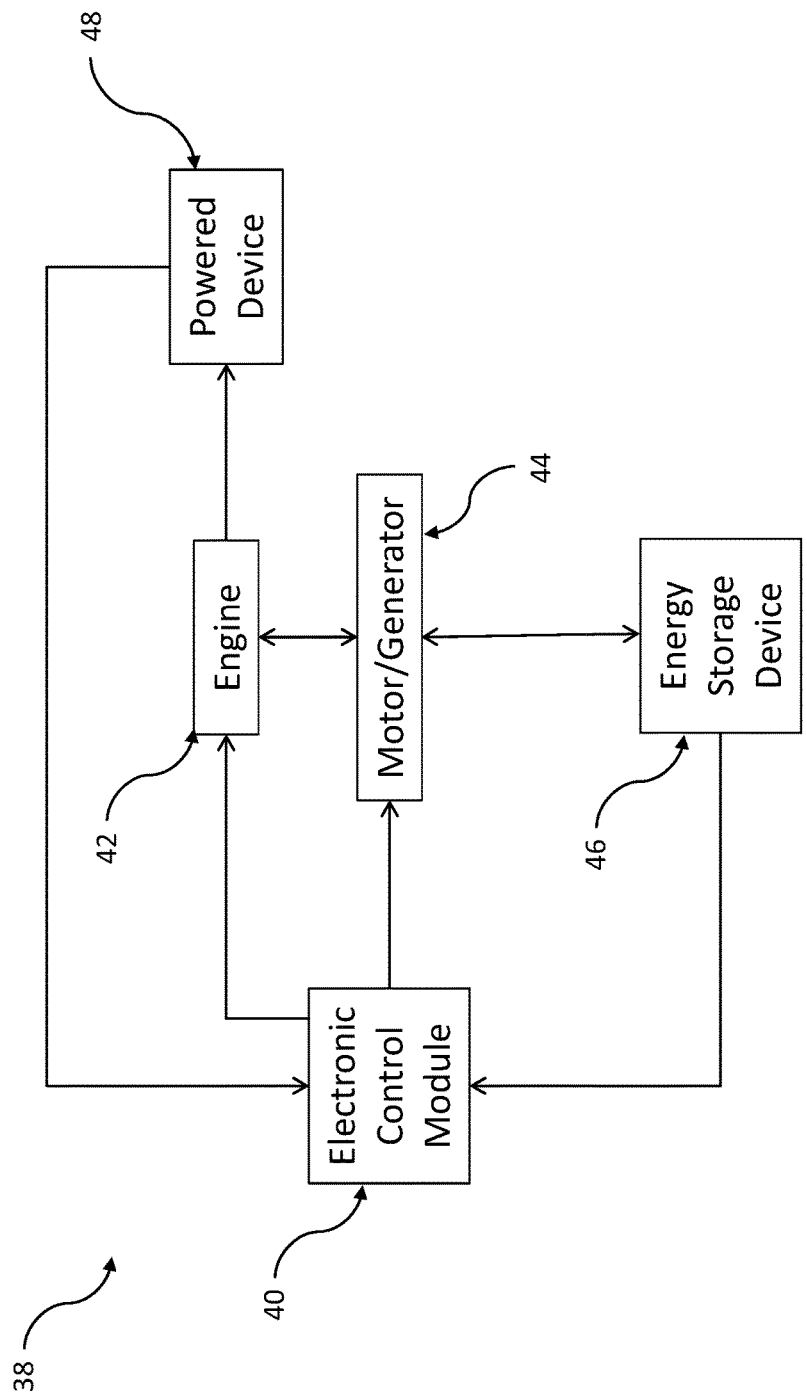
FIG. 3 is a block diagram of system according to the present disclosure.

FIG. 3 is a simplified block diagram of a system for controlling operation of a powered device such as the hay baler described above. As shown, system 38 generally includes an electronic control module ("ECM") 40 which controls the operation of an engine 42, a motor/generator ("MG") 44 and monitors a state of charge ("SOC") of an energy storage device 46 such as a battery. ECM 40 controls the operation of engine 42 and MG 44 to provide power to a powered device 48 in response to the operating conditions of powered device 48 and the SOC of energy storage device 46 as is further described below.

Referring now to FIG. 1B, a power profile 10 is depicted as delivered in one embodiment of the present disclosure. According to the present disclosure, engine 42 provides a substantially constant supply of power corresponding to the average power 20 needed for the varying load requirements of powered device 48. In the present embodiment, MG 44 is used to dampen the transitions between high power and low power operation. More specifically, during portions of profile 10 when the power required is greater than average power 20 (denoted by number 22), MG 44 supplies the additional power to powered device 48 either via engine 42 or directly. During portions of profile 10 when the power required is less than average power 20 (denoted by number 24), MG 44 collects the excess power generated by engine 42 and stores it in energy storage device 46 as is further described below. In one embodiment, the excess power that is collected is stored as electrical energy.

A block diagram depicting the operation of system 38 is depicted in FIG. 2. At block 26, the cyclical mode of operation of the equipment is identified by ECM 40. This may be accomplished in a variety of different ways. For example, the powered device 48 (e.g., baler, concrete pump, vacuum truck applications, construction equipment applications, etc.) may communicate to ECM 40 when a load change occurs or in advance of the load change. In one embodiment, communication between powered device 48 and ECM 40 includes a datalink message. In an alternate embodiment, communication between powered device 48 and ECM 40 may include a wireless communication or a hardwired input. Alternatively, ECM 40 may infer a load change by monitoring tailshaft speed (e.g., when tailshaft speed is non-zero and Power Take Off ("PTO") is operated from a transfer case). Also, the powered device 48 may be provided with an input device (e.g., a cab switch) which a user may operate to indicate to ECM 40 whether or not the principles of the present disclosure should be employed to dampen the effects of sudden load changes. Finally, ECM 40 could be programmed such that the features of the present disclosure may be enabled or disabled as a setting in a service tool.

After the cyclical mode of operation of the equipment is identified in block 26 (assuming load change damping is enabled and selected), ECM 40 controls engine 42 and MG 44 to provide power to powered device 48 in the manner described above with reference to FIGS. 1B and 3. Specifically, ECM 40 determines the average power to be delivered by engine 42 based on the amount of power required during high power portions 12 of power profile 10, the amount of power required during low power portions 16 of power profile 10, and the duty cycle of profile 10 as a whole. ECM 40 then controls engine 42 to deliver the determined average power. Additionally, ECM 40 controls MG 44 to provide additional power above the average power during portions 22 of profile 10, and to function as a generator during portions 24 of profile 22 to store energy in energy storage device 46 as indicated by block 30. Energy storage device 46 may be any of a variety of suitable devices including a battery or ultracapacitor, which can quickly absorb energy during the transient cycle and provide energy to MG 44.

As should be understood from the foregoing, by having engine 42 provide relatively constant power (i.e., steady-state), engine 42 can be tuned for improved fuel economy and reduced emissions resulting from more constant operating temperatures. It should also be understood that by having MG 44 provide variable power, equipment transient response may be improved. Electrical load variations may be detected more quickly than engine speed deviations. Thus, the control algorithms in ECM 40 get data relating to profile 10 more quickly.

As shown at block 32 of FIG. 2 and in FIG. 3, ECM 40 or other device may monitor the mean SOC of energy storage device 46. Over time, the SOC of energy storage device 46 may drift up or down, depending upon the amount of energy delivered by MG 44 and the amount of energy captured by MG 44 and stored in energy storage device 46. If the mean SOC drifts up, then the mean cyclical load has become lighter than expected. In response to a reduction of the mean cyclical load, engine 42 will reduce the power output to powered device 48. If the mean SOC drifts down, then the mean cyclical load has become greater than expected. In response to an increase of the mean cyclical load, engine 42 will increase the power output to powered device 48. As shown in FIG. 2, if a drift in the mean SOC is not detected, then monitoring of the mean SOC continues. If a drift is detected, then the steady-state operating point of engine 42 is modified by ECM 40 at block 34 as discussed above. Such modifications may result in improved engine performance in terms of fuel economy and emissions, and serve to maintain a constant mean SOC in the energy storage device.

In another embodiment of the present disclosure, SOC drifting is predicted in advance based on operational characteristics. In the hay baler example, after ECM 40 recognizes that cyclical operation is occurring, ECM 40 can learn the dynamics of the particular field/road through the last few bales baled or cyclical events. Dynamics could include temperatures, type of grass, humidity, etc. In addition, GPS information about the field/road or information entered by the operator (acres to bale, type of baler—round/square, route destination, etc.) could be added. Using this information, ECM 40 may predict SOC drifting and adjust the engine operating point sooner (i.e. in advance of actually detecting an SOC drift) to improve performance (fuel economy, aftertreatment, etc.).

Prior systems attempt to mitigate the change in load conditions of equipment by using different feedforward gains in the control loop by using engine speed as an input. However, a complicating factor is that the equipment also has periods of non-cyclical operation. As such, the system needs to provide proper flexibility to adapt the operation of the equipment for both operating conditions.

The system of the present disclosure reduces the undesirable effects of cyclical operation of the engine by supplementing the pre-existing system with electric motor contribution and tighter engine speed control. Advantageously, such a system provides better fuel economy out of the engine as it operates over a lower load range and does not have to make up for excessive deviations of engine speed (i.e., the engine does not need to be operated transiently in response to varying load conditions—the engine operates at steady-state). The system also provides for less loading of the exhaust aftertreatment system of the equipment as a lower amount of emissions are produced, which results in a longer life of the equipment.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for controlling a powered device comprising:
    an engine;
    a motor/generator;
    an ECM operably coupled to the engine and the motor/generator and configured to:
        determine whether the powered device is experiencing a cyclical load profile including high load conditions and low load conditions; and
        respond to the powered device experiencing a cyclical load profile by applying a first power component to the powered device using the engine, the first power component corresponding to an average power required by the powered device during the cyclical load profile, and applying a second power component to the powered device using the motor/generator, a sum of the first power component and the second power component corresponding to a power required by the powered device during the high load conditions.

2. The apparatus of claim 1, further comprising:
an energy storage device coupled to the motor/generator and configured to store power generated by the engine in excess of a power required by the powered device during the low load conditions.

3. The apparatus of claim 1, wherein the ECM is configured to apply the second power component using the motor/generator when the power required by the high load conditions exceeds the first power component.

4. The apparatus of claim 2, wherein the ECM is further configured to monitor a state-of-charge ("SOC") of the energy storage device and adjust the first power component in response to detecting a drift in the SOC.

5. The apparatus of claim 4, wherein the ECM reduces the first power component in response to an upward drift in the SOC, and the ECM increases the first power component in response to a downward drift in the SOC.

6. The apparatus of claim 4, wherein the ECM is further configured to predict SOC drifting in response to operational characteristics of the powered device.

7. The apparatus of claim 1, wherein the ECM is further configured to communicate with the powered device to determine in advance of a load change whether the powered device is experiencing a cyclical load profile including high load conditions and low load conditions.

8. The apparatus of claim 1, wherein the ECM is further configured to monitor tailshaft speed to infer whether the powered device is experiencing a cyclical load profile including high load conditions and low load conditions.

9. A method of controlling operation of a powered device, comprising:
determining whether the powered device is experiencing a cyclical load profile including high load conditions and low load conditions;
applying a first power component to the powered device using an engine, the first power component corresponding to an average power required by the powered device during the cyclical load profile;
collecting power generated by the engine in excess of a power required by the powered device during the low load conditions;
storing the collected power in an energy storage device; and
applying a second power component to the powered device using a motor/generator, a sum of the first power component and the second power component corresponding to a power required by the powered device during the high load conditions;
wherein applying the second power component by a motor/generator occurs in response to the power required by the powered device during the high load conditions exceeding the first power component.

10. The method of claim 9, wherein determining whether the powered device is experiencing a cyclical load profile comprises identifying operational characteristics of the powered device.

11. The method of claim 9, wherein determining whether the powered device is experiencing a cyclical load profile comprises receiving by an ECM" a message from the powered device in advance of a load change.

12. The method of claim 9, further comprising:
monitoring a state-of-charge ("SOC") of the energy storage device; and
responding to a detected drift in the SOC by adjusting the first power component.

13. The method of claim 12, wherein responding to a detected drift in the SOC comprises reducing the first power component in response to an upward drift in the SOC, and increasing the first power component in response to a downward drift in the SOC.

14. The method of claim 9, further comprising:
predicting an SOC drift in response to operational characteristics of the powered device.

15. The method of claim 9, wherein the excess power is stored as electrical energy.

16. The method of claim 9, wherein the engine operates at steady-state.

17. A method of controlling operation of a powered device, comprising:
determining whether the powered device is experiencing a cyclical load profile including high load conditions and low load conditions;
applying a first power component to the powered device using an engine, the first power component corresponding to an average power required by the powered device during the cyclical load profile;
collecting power generated by the engine in excess of a power required by the low load conditions;
storing the excess power in an energy storage device;
applying a second power component to the powered device using a motor/generator in response to the first power component being less that a power required by the powered device during the high load conditions; and
responding to a drift in a state-of-charge ("SOC") of the energy storage device by adjusting the first power component.

18. The method of claim 17, wherein determining whether the powered device is experiencing a cyclical load profile comprises receiving by an ECM a message from the powered device in advance of a load change.

19. The method of claim 17, wherein responding to a drift in the SOC comprises reducing the first power component in response to an upward drift in the SOC, and increasing he first power component in response to a downward drift in the SOC.

20. The method of claim 17, wherein the engine operates at steady-state.

* * * * *